United States Patent [19]
Kashio et al.

[11] Patent Number: 5,208,811
[45] Date of Patent: May 4, 1993

[54] INTERCONNECTION SYSTEM AND METHOD FOR HETEROGENEOUS NETWORKS

[75] Inventors: Jiro Kashio, Kawasaki; Kenji Kawakita, Yokohama; Masao Kunimoto, Yokohama; Tetsuo Takemura, Yokohama; Takeshi Harakawa, Hadano, all of Japan

[73] Assignee: Hitachi, Ltd., Tokyo, Japan

[21] Appl. No.: 607,830

[22] Filed: Nov. 1, 1990

[30] Foreign Application Priority Data

Nov. 6, 1989 [JP] Japan .................................. 1-287413

[51] Int. Cl.$^5$ ............................................. H04J 3/24
[52] U.S. Cl. .................................. 370/94.1; 370/110.1
[58] Field of Search ............... 370/94.1, 110.1, 85.14, 370/85.13, 85.12; 379/399; 340/825.51

[56] References Cited

U.S. PATENT DOCUMENTS

| | | | |
|---|---|---|---|
| Re. 33,426 | 11/1990 | Sugimoto et al. | 370/85.14 |
| 4,926,420 | 5/1990 | Shimizu | 370/110.1 |
| 4,930,123 | 5/1990 | Shimizu | 370/94.1 |

OTHER PUBLICATIONS

Dieter Japel et al "LAN/ISDN Interconnect Via Frame Relay", IBM Research Division, Zurich Research Laboratory, Session 54.2.1 of the 1988 Globecom.

Primary Examiner—Curtis Kuntz
Assistant Examiner—T. Ghebretinsae
Attorney, Agent, or Firm—Antonelli, Terry, Stout & Kraus

[57] ABSTRACT

In a network system in which an interconnection is achieved between an LAN terminal connected to an LAN and an ISDN terminal linked with an ISDN via at least an LAN/ISDN inter-working unit coupling the LAN with the ISDN, the ISDN terminal develops a function to multiplex data link connections (communication paths) identified with respective data link connection identifiers (DLCIs) on ISDN channels. After conducting a call establishment to the ISDN terminal, the inter-working unit supplies the LAN terminal with an ISDN channel number and a DLCI designating an ISDN communication path. Thereafter, the LAN terminal sends an LAN frame having an OSI layer 2 header loaded with the communication path information to the inter-working unit. On receiving the LAN frame, the inter-working unit executes a format conversion to convert the LAN frame into an ISDN frame based on the ISDN communication path information.

11 Claims, 12 Drawing Sheets

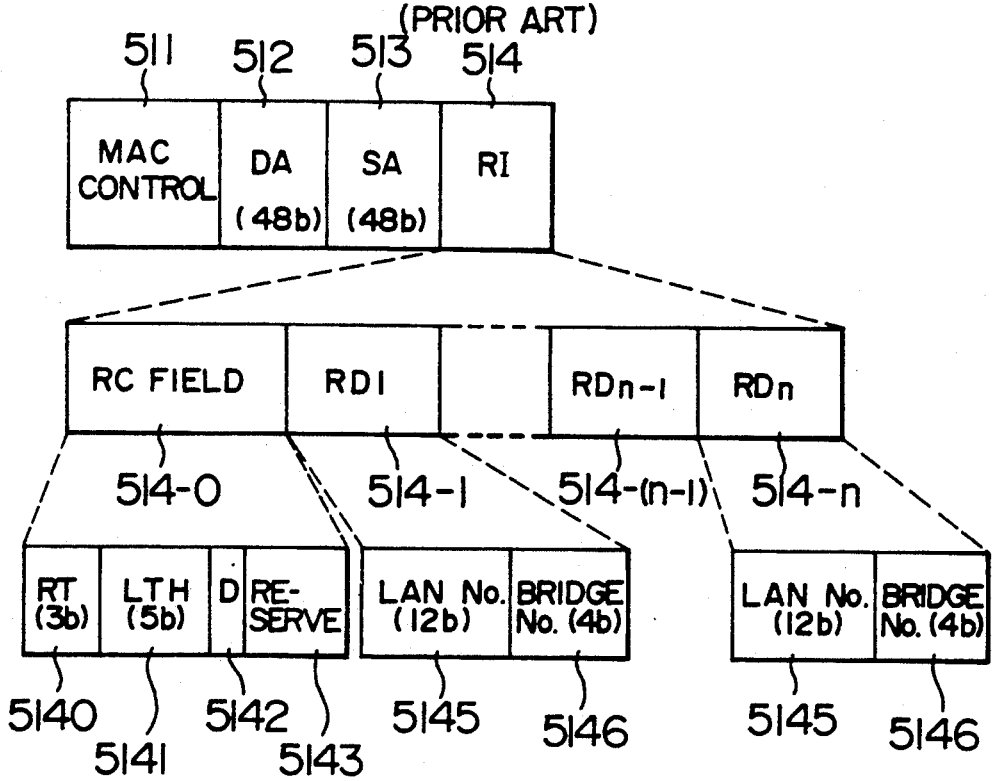

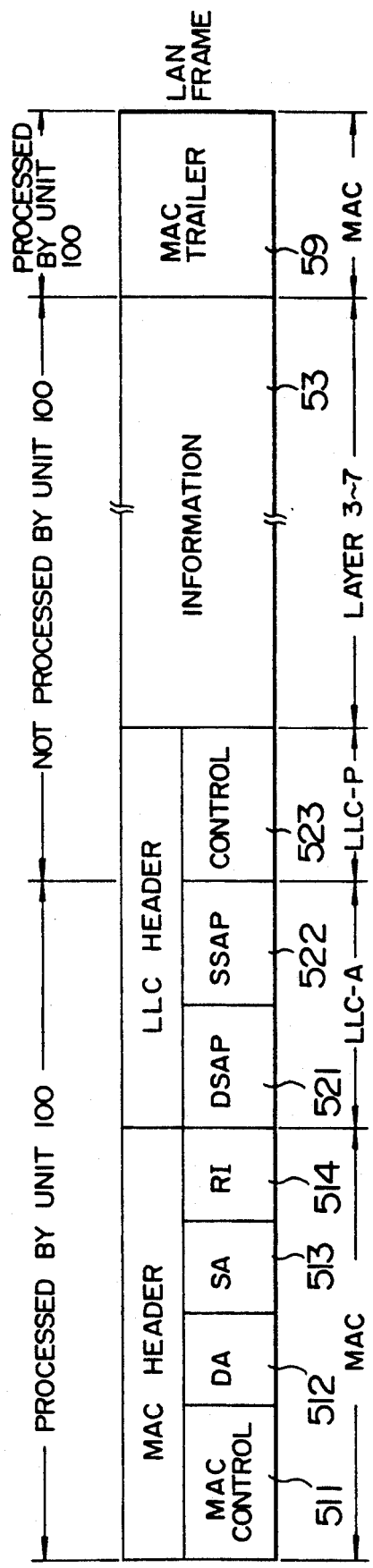
F I G. 4A
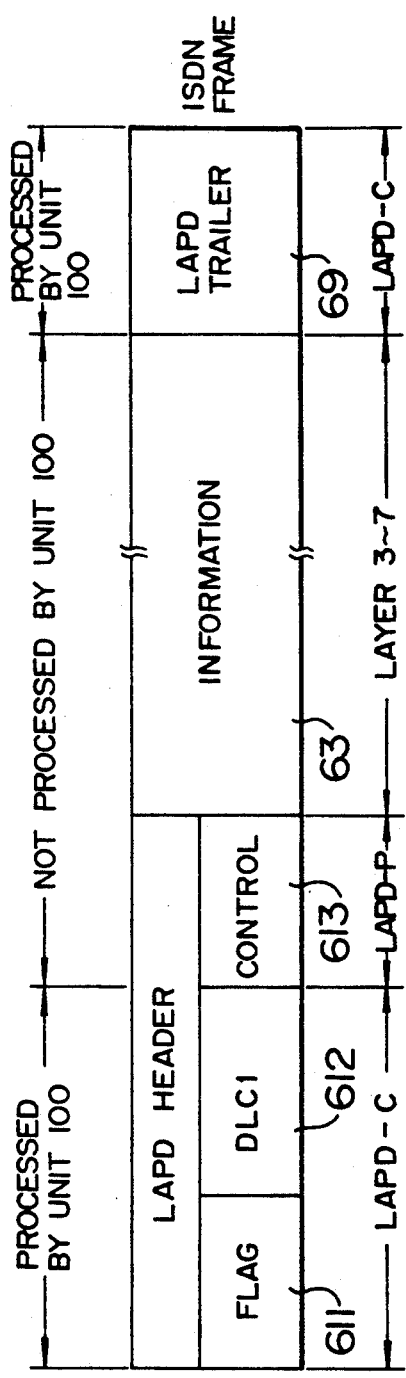
F I G. 4B

F I G. 7
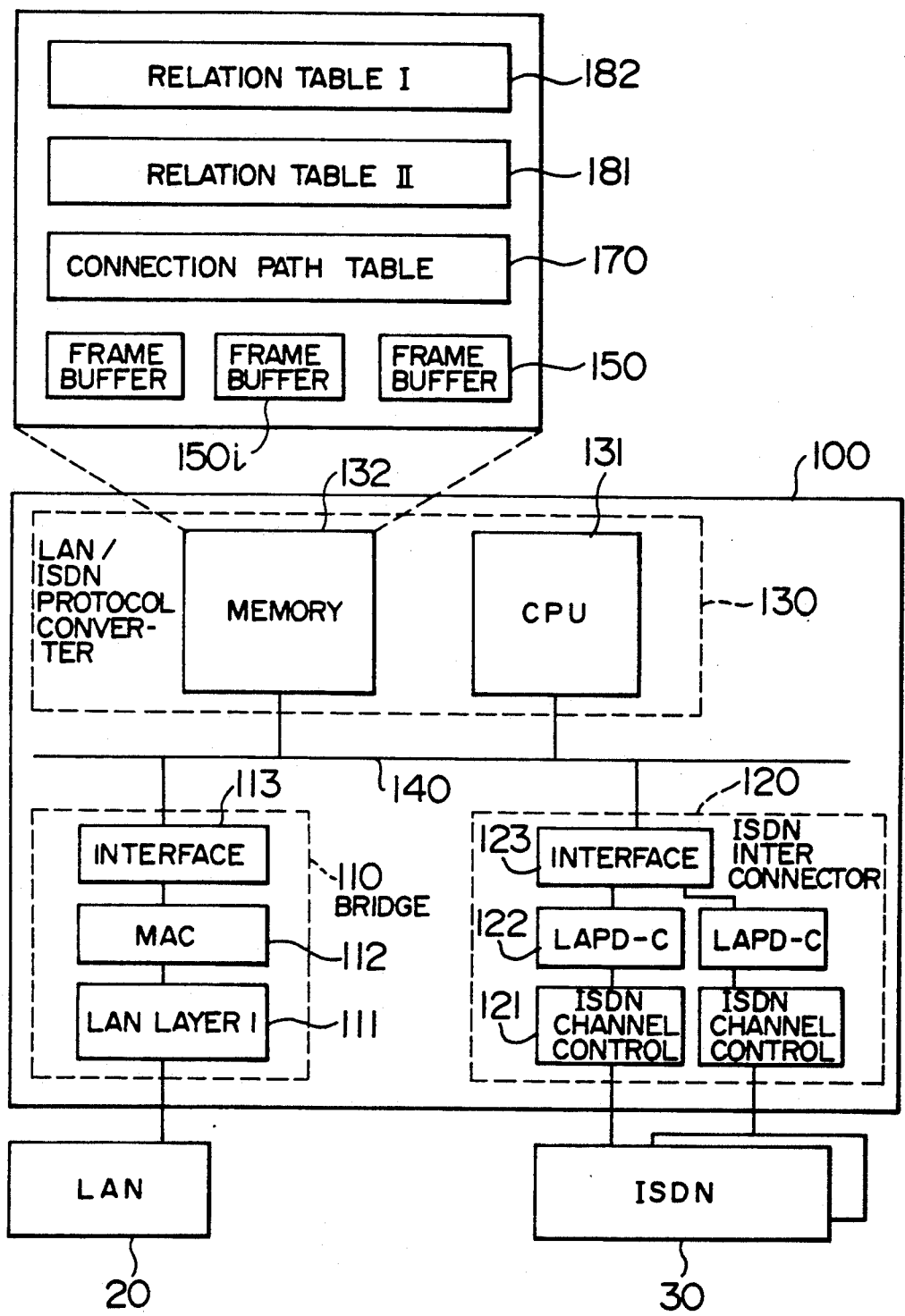

| PSEUDO LAN TERMINAL ADDRESS | ISDN TERMINAL NUMBER |
|---|---|
| $DA_1$ | $DTE_1$ |
| ⋮ | ⋮ |
| $DA_i$ | $DTE_i$ |
|  |  |

| PSEUDO ISDN TERMINAL NUMBER | LAN TERMINAL ADDRESS |
|---|---|
| $DTE_1$ | $DA_1$ |
| ⋮ | ⋮ |
| $DTE_j$ | $DA_j$ |
|  |  |

1821 — 1822

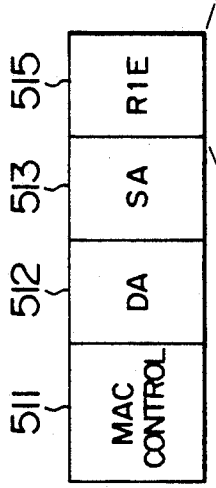
FIG. 15
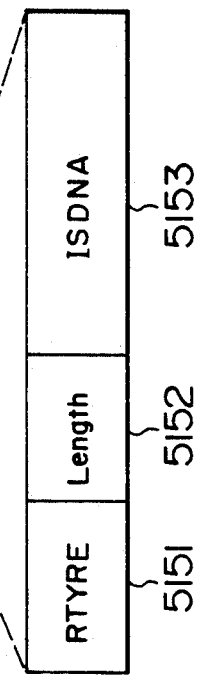
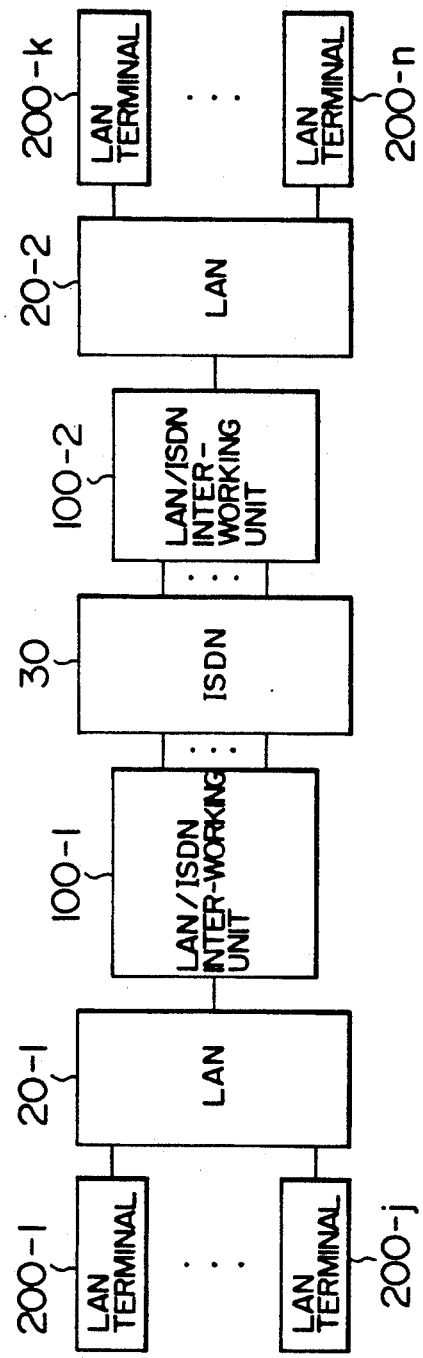
FIG. 16

INTERCONNECTION SYSTEM AND METHOD FOR HETEROGENEOUS NETWORKS

BACKGROUND OF THE INVENTION

The present invention relates to an interconnection system and method for heterogeneous networks, and in particular, to an interconnection system and method for heterogeneous networks in which a terminal of a local area network (LAN) and a terminal of an integrated services digital network (ISDN) can be interconnected with each other only through a translation of a communication path identifier of an open system interconnection (OSI) layer by means of an LAN/ISDN inter-working unit.

In heterogeneous network systems, in order to allow communications to be accomplished between two terminals, namely, between an LAN terminal connected to an LAN and an ISDN terminal linked with an ISDN via an LAN/ISDN inter-working unit, it is necessary to conduct a translation between an LAN protocol and an ISDN protocol in the inter-working unit. Since a method of specifying a communication path for the OSI layer varies between the LAN and the ISDN, the communication path specification method is required to be translated, which is one of the primary protocol translation operations.

In accordance with the Institute of Electric & Electronics Engineers (IEEE), the LAN protocol is stipulated to conform to the IEEE standards 802.2 to 802.5. In the standards, a communication path is specified by a pair of an address of an LAN terminal as a data destination and an address of an LAN terminal as a data transmitting source. Furthermore, the LAN terminal address is represented by a combination of an address of a media access control (MAC; destination and source addresses are respectively abbreviated as DA and SA) and an access point of a logical link control (LLC; destination and source access points are respectively denoted as DSAP and SSAP). In consequence, the LAN terminal provides the OSI layer with a communication path designated as "DA, SA, DSAP, SSAP". Namely, a communication frame assigned with these addresses is transferred through an LAN communication path.

On the other hand, a draft of a standardized protocol for an efficient packet communication in the ISDN are currently being discussed as an additional packet mode bearer service (APMBS) in the International Consultive Committee for Telephone and Telegraph (CCITT). The APMBS is characterized in that the data link control procedure called the link access procedure on the D-channel (LAPD) adopted for the D channel of the ISDN in the present stage is expanded to be applicable to other channels so as to multiplex a plurality of data link connections on ISDN channels. In communication conforming to a protocol stipulated as the APMBS, a communication path is denoted by use of a set of an ISDN channel number and a data link connection identifier (DLCI). Since the ISDN channel number is identified in a physical layer, the ISDN line is supplied with a frame including the LAPD header containing the DLCI, which will be described later in conjunction with FIG. 4B.

Heretofore, the interconnecting system associated with the LAN and the ISDN has been described, for example, in an article, Dieter Jäpel, et al., "LAN/ISDN Interconnect Via Frame Relay" published in Session 54.2 of the 1988 GLOBECOM.

FIG. 1 shows the configuration of a network system in which an LAN 20 accommodating a plurality of LAN terminals 200-1 to 200j is interconnected via an LAN/ISDN inter-working unit 100 to an ISDN 30 connecting a plurality of ISDN terminals 300-1 to 300i. In the following description, the LAN 20 may be a single LAN or may be a multi-LAN including a plurality of LANs interconnected to each other by means of a bridge. This is also the case of the ISDN 30. Furthermore, each LAN terminal 200 is provided with an LAN protocol standardized in conformity with the IEEE, whereas each ISDN terminal 300 supports a frame relay protocol selected according to the CCITT APMBS.

In the network system of FIG. 1, for example, in order to enable the LAN terminal 200-j to communicate with the ISDN terminal 300-i, the LAN/ISDN inter-working unit 100 is required to posses the following functions.

Namely, in a frame communication with the LAN terminal, the LAN/ISDN inter-working unit 100 functions, as shown in FIG. 2A, such that the communication is achieved via a bridge 110 with a pseudo LAN 22 accommodating pseudo LAN terminals 310-1 to 310-i associated with the ISDN terminals 300-1 to 300-i. On the other hand, when achieving a frame communication with the ISDN terminal, the LAN/ISDN inter-working unit 100 operates, as shown in FIG. 2B, so that the communication is achieved via an ISDN inter-connector 120 with a pseudo ISDN 32 accommodating pseudo ISDN terminals 210-1 to 210-j related to the LAN terminals 200-1 to 210-j. For these two kinds of operations, the ISDN inter-working unit 100 is required to be provided with three function as shown in FIG. 2C, namely, the functions of the bridge 110, an LAN/ISDN protocol converter 130 (for an address translation and a route or routing control), and the ISDN inter-connector 120.

The address translation and routing control unit, namely, the LAN/ISDN protocol converter 130 converts the communication path identifier (DA, SA, DSAP, SSAP) in a frame received from the LAN 20 into an ISDN communication path indicator (ISDN channel number, DLCI) to send the received frame to the ISDN inter-connector 120 processing in association with the ISDN channel number. In this situation, the DA is designated by an MAC address of a pseudo LAN terminal beforehand registered to the ISDN inter-connector 120. Conversely, on receiving a frame from the ISDN 30, the converter 130 translates an ISDN communication path indicator denoted by an DLCI and a reception channel number assigned to the frame into an LAN communication path identifier to transfer the reception frame to the bridge 110.

For the conversion between the LAN and ISDN communication paths, the LAN/ISDN inter-working unit 100 is required to retrieve a table 190 of FIG. 3.

The table 190 comprises, for a definition of an LAN communication path, a field 191 indicating an MAC address DAi of a destination or called LAN terminal i, a field 192 denoting an MAC address SAj of a calling LAN terminal j, a field 193 designating an LCC service access point (SAPi) of the destination LAN terminal DAi, and a field 194 indicating LLC·SAP of the calling LAN terminal DAj. Furthermore, the table 190 includes, for a definition of an ISDN communication path, a field 195 denoting an ISDN channel number $P_j$ in the LAN/ISDN inter-working unit 100 and a field 196 designating a data link connection identifier DLCI independently assigned to each ISDN channel. A plurality of data link connections are multiplexed on each ISDN channel such that each data link connection is identified depending on the DLCI.

In this configuration, however, since the table 190 has a size determined by the number of combinations each including the DA, SA, DSAP, and SSAP, the capacity thereof becomes greater in association with an increase in the numbers respectively of the LAN and ISDN terminals communicating with each other. Moreover, at present, the MAC address of the LAN is generally 48 bit long, and such addresses are beforehand written in an read-only memory (ROM) at a delivery of the LAN terminal. Consequently, the user may be required to adopt these addresses in some cases. It is hence difficult to restrict only the MAC addresses of the LAN terminal to be communicated with the ISDN terminal to take successive values in a particular range.

In an interconnection between the LAN and the ISDN, when converting a communication path on the LAN side designated by a combination (DA, SA, DSAP, SSAP) of the MAC and LLC addresses assigned to an LAN frame into a communication path on the ISDN side indicated by a set (ISDN channel, DLCI) of a physical address and a data link identifier of the ISDN associated with the LAN, the retrieval of the table containing relations therebetween takes a considerably long period of time.

In other words, when retrieving the conversion table to obtain an entry (DAi, SAj, DSAPi, SSAPj) for a communication path identifier (DA, SA, DSAP, SSAP) assigned to a frame from the LAN, a long period of time is required for the LAN/ISDN inter-working unit to check a lot of entries stored in the conversion table. As a method of reducing the retrieval period of time, the DAs and SAs may possibly be loaded in the table at relative entry addresses having correspondences with the DAs and SAs. However, as described above, the DAs and SAs each are 48 bit long and the values thereof, particularly, the values of SAs cannot be easily limited to a particular range. In consequence, if the table is not of quite a large capacity, the method above cannot be considered to be practically feasible.

SUMMARY OF THE INVENTION

It is therefore an object of the present invention to provide an interconnection system and method capable of facilitating a protocol conversion for heterogeneous networks, for example, between the LAN and the ISDN.

In order to achieve the object above according to the present invention, for example, when allocating a communication path on the ISDN side in association with a communication path on the LAN side, the LAN/ISDN inter-working unit notifies an identifier of the communication path on the ISDN side to a pertinent LAN terminal. In the communications to be accomplished thereafter, the LAN terminal assigns the LAN and ISDN communication path identifiers to a transmission frame. With this provision, on receiving a frame from the LAN terminal, the LAN/ISDN inter-working unit need not retrieve the conventional communication path conversion table of FIG. 3 in ordinary cases.

When the LAN terminal adopts a source routing system, a route information (RI) field of a route discovery frame includes $RD_{n-1}$ (n−1: routing index) and RDn fields loaded with an ISDN channel number and DLCI designating a communication path on the ISDN side. In the conventional technology, the RI field is disposed to specify or to discover a path for a frame to be transmitted via a plurality of LANs connected to each other by means of a bridge. Usages of the RI field have been described, for example, in an article entitled "Draft Addendum to ANSI/IEEE std 802.5-1988 Token Ring MAC 6 PHY Specification Enhancement for Multiple-Ring Networks", May 17, 1989, IEEE802.5. According to the article, an RD field is constituted with a plurality of sub-fields such that each subfield RDi (i=1 to n) contains a number assigned to an LAN (a ring number for a token ring) and a bridge number through which the associated frame is to be passed.

In accordance with the present invention, when viewed from each LAN terminal, the ISDN side seems to be one of plural LANs connected to each other in a serial manner such that when the LAN terminal uses the source routing system, the message format can be quite easily converted without necessitating any alteration in the structure or function of the LAN terminal. When receiving a frame not including an ISDN channel number and DLCI in the subfields $RD_{n-1}$ and RDn (for example, when an LAN terminal sends a frame to discover a transmission path), the LAN/ISDN inter-working unit retrieves an address correspondence table of FIG. 10, which will be described later, to determine whether or not a destination address DA contained in the received frame indicates an address of a pseudo LAN terminal associated with an objective ISDN terminal. If this is the case, the inter-working unit accomplishes processing as follows.

(1) An available ISDN channel is determined to establish a call with the objective ISDN terminal to open a communication path. In this operation, the DLCI is assigned by the inter-working unit itself or by the ISDN. This results in a correspondence established between the communication path (DA, SA, DSAP, SSAP) on the LAN side and the ISDN-side communication path (ISDN channel number, DLCI). Consequently, a frame including the ISDN channel number and the DLCI loaded in the subfields $RD_{n-1}$ and RDn of the RI field can be returned to the LAN terminal which has transmitted the reception frame above. After this point of time, the LAN terminal can communicate with the ISDN terminal a frame loaded with these values.

(2) In order for the LAN/ISDN inter-working unit, when an ISDN channel number and a DLCI are identified, to obtain an LAN-side communication path and route information associated therewith, there is beforehand produced a communication path table (a configuration example thereof will be described later in conjunction with FIG. 9). The table is employed, in addition to a communication path conversion and a route information adding operation required when a frame received from the ISDN side is sent to the LAN side, to confirm contents of a header of a frame received from the LAN side.

When compared with the retrieval of a ISDN-side communication path (ISDN channel number, DLCI) based on an LAN-side communication path (DA, SA, DSAP, SSAP), the retrieval of the ISDN-side communication path by use of the LAN-side communication path takes a shorter period of time. This is because that the DLCI is represented in a shorter length, for example, with 13 bits. Moreover, consecutive values may be assigned to a plurality of DLCIs to be referenced by the LAN/ISDN inter-working unit. In addition, the ISDN channel number can be assigned by the inter-working unit in an independent manner; furthermore, although the number to be assigned depends on the number of ISDN lines connected to the inter-working unit and the line speed, the maximum channel number to be adopted is limited to at most several hundred.

By using the relative address $P_j$ denoting a position of an entry in the relation table in association with $DLCI_i$, which will be described later in conjunction with FIG. 9, the table retrieving speed can be increased.

The foregoing and other objects, advantages, manner of operation, and novel features of the present invention will be understood from the following detailed description when read in connection with the accompanying drawings.

BRIEF DESCRIPTION OF THE DRAWINGS

FIG. 3 is an explanatory diagram for explaining a conventional table adopted to convert an information item of a communication path definition between an LAN and an ISDN;

FIGS. 4A and 4B are diagrams respectively showing LAN and ISDN communication frame structures;

FIG. 5 is a schematic diagram showing an example of conventional route information adopted in the source routing system;

FIG. 7 is a diagram showing an example of the constitution of the LAN/ISDN inter-working unit 100;

FIG. 10 is a diagram schematically showing an embodiment of a first terminal number correspondence table 181;

FIG. 12 is a diagram showing an example of a second terminal number correspondence table 182;

FIG. 15 is a diagram showing the structure of a frame to be communicated by an LAN terminal not adopting the source routing system in accordance with the present invention; and FIG. 16 is a diagram showing another configuration example of a network system to which the present invention is applied.

DESCRIPTION OF THE PREFERRED EMBODIMENTS

Figure 1:
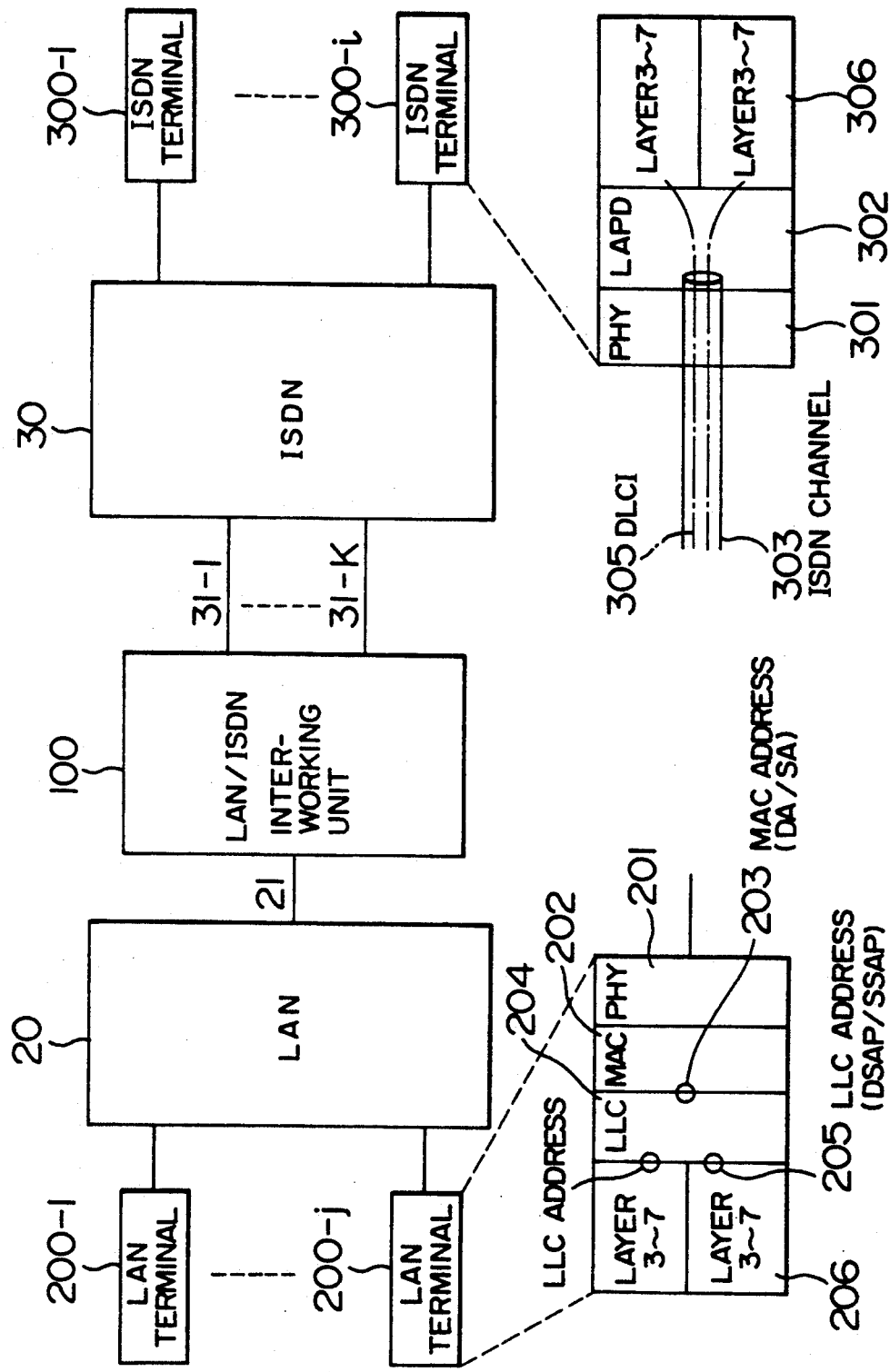
FIG. 1 is a schematic diagram showing an example of a network system including a plurality of different kinds of networks to which the present invention is applied.
Figure 2A:
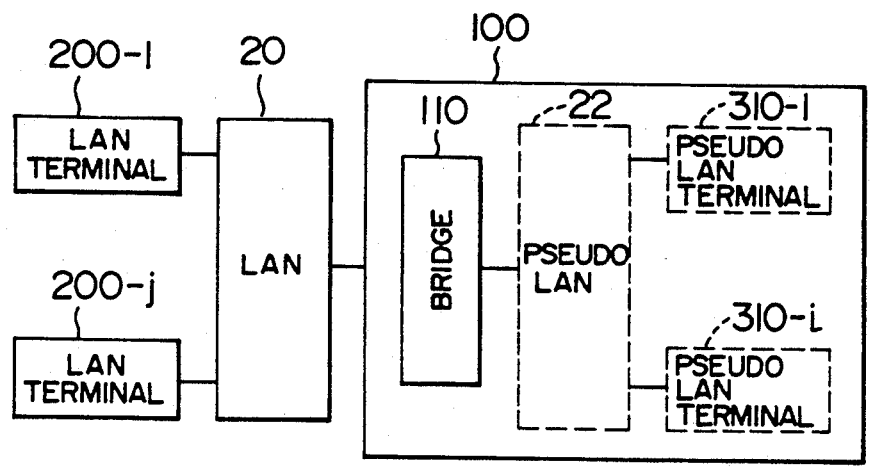
FIGS. 2A to 2C are diagrams useful to conceptually explain functions of an inter-working unit 100 for heterogeneous networks in accordance with the present invention.
Figure 2B:
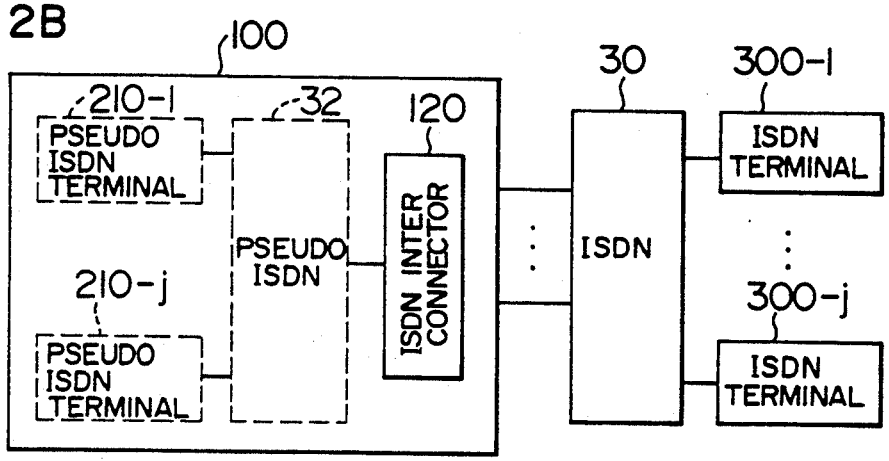
Figure 2C:
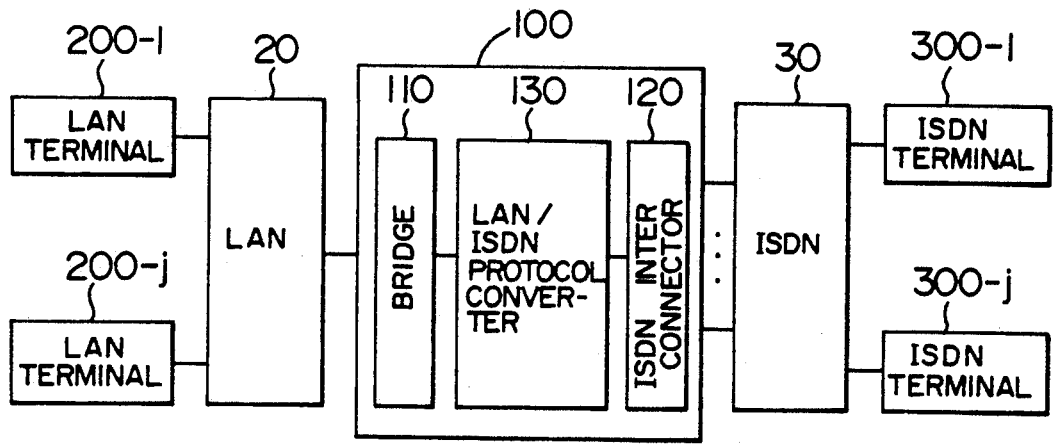

FIG. 1 shows a network system as an example of a heterogeneous network system including an LAN 20 and an ISDN 30. According to the present invention, the network system of FIG. 1 includes, in order to enable a group of LAN terminals 200-1 to 200-j connected to the LAN 20 to communicate with a group of ISDN terminals 300-1 to 300-i linked with the ISDN 30 in the network system, an LAN/ISDN inter-working unit 100 to achieve an interconversion between an LAN protocol and an ISDN protocol.

In the specifications of the LAN protocol stipulated in the IEEE Standards 802.2 to 802.5, the protocol is structured in a hierarchy having a physical layer 201, an MAC layer 202, and an LLC layer 204 as shown in the network system of FIG. 1. The LAN terminal communicates a frame constituted in a format including, as shown in FIG. 4A, an MAC header 50, an LLC header 52, an information field 53, and an MAC trailer 59. In this regard, the MAC layer 202 is adapted to accomplish a control operation such that a plurality of LAN terminals achieve frame communications via a transmission medium.

The MAC layer 202 processes the MAC header 50 and the MAC trailer 59 contained in the frame of FIG. 4A. The MAC header 50 comprises a control field 511, a field 512 denoting an MAC address (DA) of a destination LAN terminal, a field 513 designating an MAC address (SA) of a source LAN terminal, and a routing information (RI) field employed when the most-significant bit of the SA is "1". The RI field 514 indicates a route (specified by an LAN and a bridge) to be used when a plurality of LANs are connected to each other by means of bridges so as to denote a route, which is used by a frame sent from a terminal to reach an objective LAN terminal. The RI field is employed when the LAN terminals are operating in the source routing system. The RI field is configured in a data format of FIG. 5.

Namely, the RI field 514 comprises an RC field 514-0 and a plurality of RD fields 514-1 to 514-n. The RC field 514-0 includes a plurality of subfields comprising an RT field 5140, which is respectively set to "000" and "100" when the specified route is already identified in an order of RD1 to RDn and when the route is unidentified, namely, when a portion or all of the routing items RD1 to RDn is required to be discovered. The Subfields further includes an LTH field 5141 designating the number n of RD fields related to identification of the route and a D field 5142 denoting a routing direction. For example, for D=0, the routing is carried out in a sequence from RD, to RDn; whereas for D=1, the routing is accomplished in a reverse order from RDn to $RD_1$. The RD fields 514-1 to 514-n each include an LAN number field 5145 and a bridge number field 5146.

Returning now to FIG. 1, the LLC 204 is disposed to identify a service access point (SAP) to the OSI layer 3, thereby guaranteeing a frame transfer service for the LSI layer 3 associated with the destination and source LAN terminals. The LLC 204 processes such contents of the LLC header 52 as a destination service access point (DSAP) field 522, a source service access point (SSAP) field 521, and a control field 523. In this connection, the LLC 204 can be classified into an LLC-A portion for processing the DSAP and SSAP and an LLC-P portion for achieving a control processing.

The OSI layer 3 is supplied with a communication path of the LAN OSI layer 2, which is presented with a combination (DA, SA, DSAP, SSAP) of the DA 512 and the SA 513 of the MAC header 50 and the DSAP 521 and the SSAP 522 of the LLC header 52.

On the other hand, the data communication protocol adopted in the ISDN is structured in a hierarchy having a physical layer 301, a data link 302, and layers 3 to 7. In a standardized system called APMBS according to the CCITT, the data link 302 conforms to a data link control LAPD adopted to control the signal processing D channel. Incidentally, although the LAPD above is implemented by modifying such portions of the original or conventional LAPD as an address field, the resultant LAPD is also referred to as LAPD in this specification.

The ISDN adopts a frame format of FIG. 4B including an LAPD header 60, an information field 63, and an LAPD trailer 69. The LAPD 302 processes such contents of the received frame as the LAPD header 60 and the LAPD trailer 69. The LAPD header 60 includes a flag field 611 designating a start point of the frame, a DLCI field 612 as a data link connection identifier, and a control field 613. The processing accomplished by LAPD 302 can be split into an LAPD-C processing associated with the flag 611, the DLCI 612 of the LAPD header 60 and the LAPD trailer 69 and an LAPD-P processing related to the control field 613 of the LAPD header 60. The LAPD header control field 613 and the LLC header control field 523 of FIG. 4A have the same data format. In order to use the LAPD-P and the LLLC-P processing the respective protocols without any alteration thereof or in order to minimize the alteration thereof, if any, efforts have been made for modifications of the protocols in pertinent sections of the CCITT and IEEE standardization divisions. In this situation, according to the present invention, the inter-working unit 100 is basically relieved from the processing of the LLC-P and LAPD-P and the processing of the information fields 53 and 63.

The OSI layer 3 is supplied with a communication path of the ISDN APMBS, which is denoted by a combination (an ISDN channel and DLCI) of a channel number of the ISDN channel 303 handled by the physical layer 301 and the DLCI 305 processed by the LAPD 302 of FIG. 1.

Figure 6:
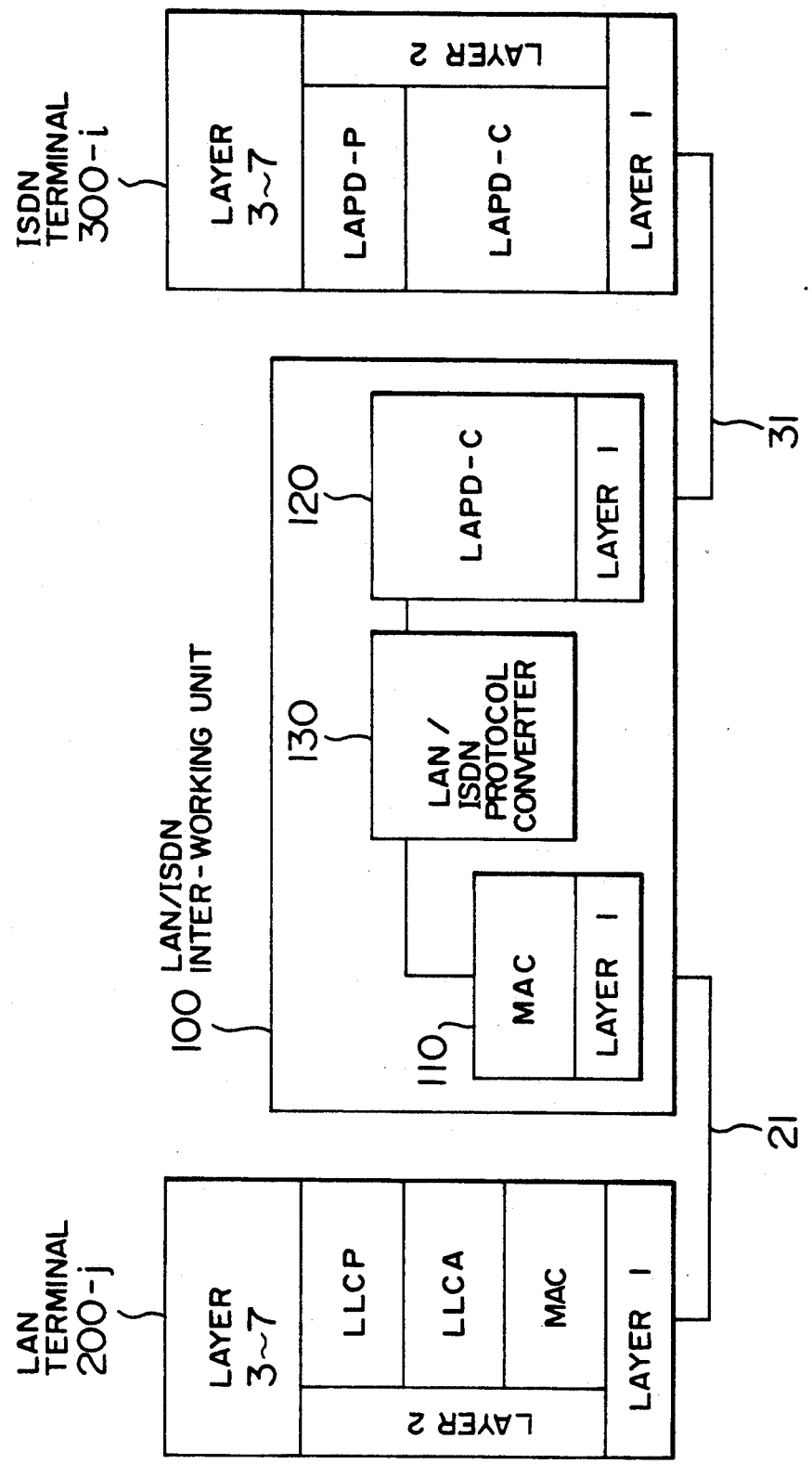
FIG. 6 is a diagram showing an example of a protocol configuration in a network system according to the present invention.

FIG. 6 shows functions to be achieved by the LAN terminal 200-j, the LAN/ISDN inter-working unit 100, and the ISDN terminal 300-i. The LAN/ISDN inter-working unit 100 includes a bridge 110 processing the MAC and the layer 1 (LAN physical layer), an ISDN inter-connecter 120 for processing the LAPD-C and the layer 1 (ISDN physical layer), and an LAN/ISDN protocol converter 130 for achieving an address translation and a routing control. FIG. 7 shows an example of the constitution of the LAN/ISDN inter-working unit 100 according to the present invention. The LAN-/ISDN protocol converter 130 includes a memory 132 and a central processing unit (CPU) 131, which are connected to a bus 140. The memory 132 is used to form therein a plurality of frame buffers 150, a connection or communication path table 170, and relation tables 181 and 182. The bridge 110 comprises a bus interface 113 for communicating data and commands with the memory 132 and the CPU 131 via the bus 140, an MAC processing unit 112 processing the MAC header and the trailer above, and a circuit section 111 having the function of the LAN layer 1. The ISDN inter-connector 120 comprises a bus interface 123 developing a function similar to the function of the interface 113 of the bridge 110, an LAPD-C processing unit 122, and an ISDN channel control unit 121. The LAPD-Cs 122 and ISDN channel controls 121 are respectively disposed as many as there are ISDN lines.

The processing conducted by the LAN/ISDN inter-working unit 100 for a frame sent from the LAN 20 to the ISDN 30 will be summarized as follows. The LAN layer 1 (circuit unit 111) monitors a signal on the LAN transmission path to establish a bit synchronization so as to pass a bit series to the MAC 110. The MAC 110 fetches the received bit series in a reception buffer of the MAC header 50, the buffer having a capacity to store the bit series therein. The MAC checks contents of the DA 512 and the RI 514 of the MAC header 50 to determine whether or not the frame is to be received. If this is the case, the interface 113 is activated to initiate an operation to transfer contents outputted from the reception buffer to a frame buffer 150-i available in the memory 132, the contents being obtained from an area ranging from the DA field 512 of the MAC header 50 to the information field 53. The MAC 112 continuously transfers, in addition to the MAC header, bit series from the LAN layer 1 via the reception buffer to the frame buffer 150-i. On detecting an end of the frame, the MAC 112 conducts processing of the MAC trailer 59. If an abnormality takes place, the MAC 112 cancels the contents already transferred to the frame buffer 150-i. When the reception is normally finished, the length of the octets thus transferred is set to the frame buffer and then an interruption is caused in the CPU 131 via the interface 113.

The interrupted CPU 131 checks the frame buffer 150-i to generate an ISDN channel number and a DLCI 612 based on the DA 512, SA 513, RI 514, DSAP 521, and SSAP 522 stored in the buffer 150-i. The obtained items are overwritten in an area associated with the DA512 to SSAP 522 in the frame buffer 150-i. The CPU 131 then activates the interface 123.

In response to the initiation, the interface 123 activates an LAPD-C 122 depending on the ISDN channel number in the frame buffer 150-i. The LAPD-C 122 transmits a content of the flag 611 via the ISDN channel control 121 to the pertinent ISDN channel and then continues supplying the ISDN with contents of the area of the DLCI 612 to the information field 63 attained from the frame buffer 150-i so as to finally generate an LAPD trailer 69, thereby sending the trailer 69 to the ISDN.

Conversely, a frame transmitted from the ISDN to the LAN is processed through a reverse sequence of the processing order above. In this operation, the CPU 131 creates a combination of the DA, SA, RI, and DSAP based on the ISDN channel number and the DLCI.

Next a description will be given in more detail of a communication path conversion, which is one of the primary functions in accordance with the present invention, namely, a conversion between an LAN communication path (DA, SA, DSAP, SSAP) and an ISDN communication path (ISDN channel number, DLCI).

First, the description will be given of a case where the LAN terminal 200 is operating in the source routing system. In this system, the LAN terminal 200 communicates a frame including a routine information (RI) field RI 514 of FIG. 5. The RI field 514 comprises an RC field 514-0 constituted with an RT field 5140 denoting a routing state, an LTH field 5141 designating the number of consecutive items RD1 to RDn, and a D field 5142 indicating a routing direction. The items RD1 (514-1) to RDn (514-n) designate routing indices designating a sequence of n LANs. Namely, a frame passes through n LANs connected to each other by means of bridges 110 according to the sequence.

Figure 8:
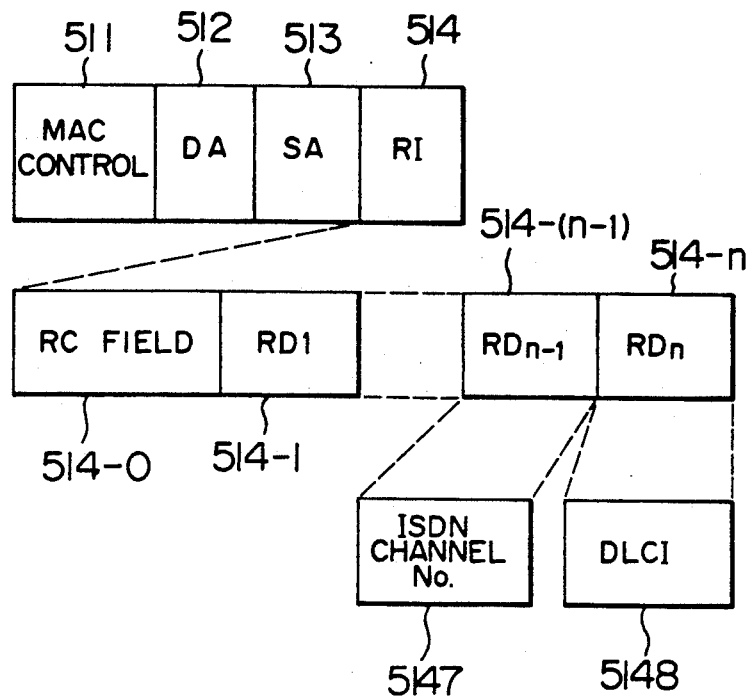
FIG. 8 is a diagram showing an example of a frame format to be transmitted from a terminal adopting the source routing system in accordance with the present invention.

For each bridge connecting LANs to each other, an RDi field (i=1 to n) is loaded with an LAN number and a bridge number. However, in accordance with the present invention, for the respective LAN terminals, the ISDN connected to the LAN via the LAN/ISDN inter-working unit 100 apparently or virtually seems to be constituted with a virtual LAN so as to minimize alteration or modification in the LAN terminal and to reduce the processing load imposed on the inter-working unit 100. For this purpose, as shown in FIG. 8, portions of the RI field 514, namely, the RD field 514-(n-1) and RDn field 514-n are loaded with an ISDN channel number 5147 and a DLCI 5148, respectively. This is also the case of a frame from the LAN terminal 200 to the inter-working unit 100 with the D field 5142 set to "0" and a frame from the unit 100 to the LAN terminal 200 with the D field 5142 set to "1". In a case of the reverse routing direction, namely, where the D field 5142 is set to "0", the fields $RD_{n-1}$ and RDn are loaded with a DLCI and an ISDN channel number, respectively. In this regard, when the values to be set to the ISDN channel number and the DLCI are limited to a small range, there may be used only an RD field to store the values therein. In such a case, for the LAN terminal 200, the ISDN 30 virtually seems to be constituted with an LAN. Conversely, when the value of the ISDN channel number or the DLCI exceeds the range of values to be represented by an RD field, a plurality of RD fields will be adopted to represent the pair of the ISDN channel number and the DLCI or a value obtained by combining these values. Moreover, when information is to be notified to the LAN terminal 200 to control the ISDN communication path, the RD field may be used for the storage thereof. Alternatively, a reserved area 5143 of the RC field may be employed to denote existence of an additional information field following the RDn field, thereby setting the additional information to the field after the RDn field.

Referring now to FIG. 5 and FIGS. 7 to 11, a description will be given of processing to be conducted in the LAN/ISDN inter-working unit 100 when a frame is received from the LAN terminal 200.

Figure 9:
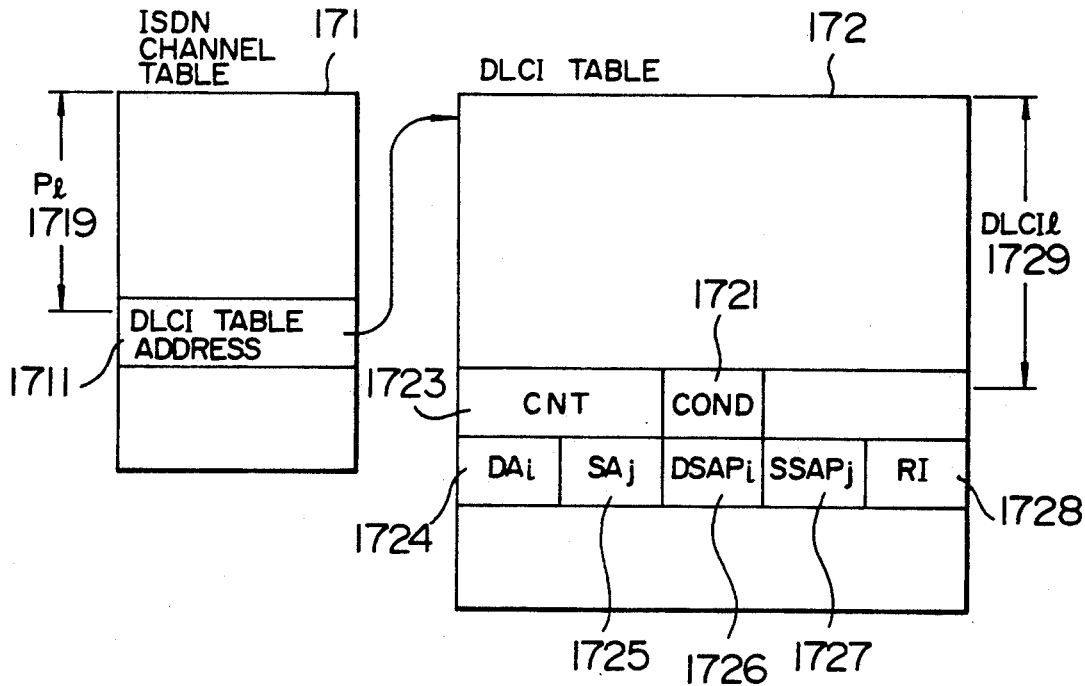
FIG. 9 is a schematic diagram showing an embodiment of a communication path table employed in a frame format conversion according to the present invention.

The frame to be processed by the unit 100 is written in the frame buffer 150 of the memory 132 by the bridge 110. The CPU 131 achieves the processing on the received frame loaded in the frame buffer 150 in accordance with the flowchart of FIG. 11 while referencing the connection or communication path table 170 and the terminal relation table 181. The connection path table 170 includes, as shown in FIG. 9, an ISDN channel number table 171 and a DLCI table 172; whereas the relation table 181 comprises, as shown in FIG. 10, a correspondence relation between a pseudo LAN terminal address 1811 and an ISDN terminal number 1812 for each entry thereof.

The CPU 131 first checks to determine whether or not an ISDN channel number and a DLCI have been loaded in the RI field 514 of the received frame (step 710). For this decision, the value of the RT field 5140 is checked. For RT="1XX" (X is "1" or "0"), the frame is recognized to be a route discovery frame. consequently, the ISDN channel number and the DLCI are missing in the RI field. On the other hand, for RT="000", the fields RD, to RDn denote a specified route and hence these values have already been loaded therein. The CPU 131 then checks the LTH 5141 of the RC field 514-0 to determine whether or not the field $RD_{n-2}$ (LAN number, bridge number) associated with a bridge in the LAN/ISDN inter-working unit 100 is followed by the fields $RD_{n-1}$ and RDn.

If it is resultantly found that the ISDN channel number and the DLCI are missing in the received frame, the CPU 131 executes processing steps 711 to 714 of FIG. 11 as follows. Step 711: The CPU 131 accesses the table 181 of FIG. 10 with a retrieval key set to a pseudo LAN terminal address DAi loaded in the DA field 512 of the received frame to attain an address DTEi of an objective ISDN terminal. Step 712: An available ISDN channel is selected to establish a call for the objective ISDN, thereby opening a communication path between the inter-working unit 100 and the ISDN terminal. In this regard, the available ISDN channel here is selected under conditions, for example, that the channel is actually disposed, that the channel is in a normal state, that the channel is in an unused state, and that the number of connections to be used is in an allowable range with respect to the communication speed. When opening the communication path, the LAN/ISDN inter-working unit 100 or the ISDN 30 assigns a DLCI. Moreover, the call establishment here means a transmission of a call establishment message with an objective ISDN terminal specified therein. When a response is received in reply to the message, the interworking unit 100 assumes that the call is opened. Step 713: The communication path table 170 of FIG. 9 is produced. Namely, the ISDN channel number of the communication path is adopted as a relative address (P 1719) to indicate a record area of the ISDN channel number table 171, the address being relative to a first address point of the table 171. The address 1711 of the DCLI table 172 is set to the record area of the table 171. Furthermore, the DLCI of the communication path is employed as a relative address ($DLCI_l$ 1729) to indicate a record area of the DLCI table 172, the address being relative to a first address point of the table 172. The record area of the DLCI table 172 is loaded with a DLCI record (entry), the record being constituted with the CNT 1723, COND 1721, DAi 1724, SAj 1725, DSAPi 1726, SSAPj 1727, and RI 1728. The COND field 1721 is used to store therein data indicating a state of the ISDN communication path. For example, "1XX" and "0XX" respectively denote a completed state of a call establishment and an incompleted state of a call establishment. In this example, the COND 1721 is assumed to denote that the call has been established. The CNT 1723 field specifies that the DLCI for the call establishment or clear operation is a special DLCI or an ordinary DLCI. Moreover, the fields DAi, SAj, DSAPi, and SSAPj above are respectively loaded with the contents respectively of the DA field 512, the SA field 513, the DASP field 521, and the SSAP field 522 of the received frame. The contents of the RD fields (RD, to $RD_{n-2}$) 514 of the received frame and the length thereof are set to the RI field 1728. In this regard, the actual content of the RI field 1728 may be stored in another table such that the RI field 1728 is only loaded with an address indicating a table containing the actual data of $RD_1$ to $RD_{n-2}$. Step 714: The DLCI and the ISDN channel number are set to the RD$_1$ and RD$_2$ fields of the RI field 514. The CPU 131 then loads "1XX", "0", SAj, DAi, SSAPj, and DSAPi in the fields RT 5140, D 5142, DA 512, SA 513, DSAP 521, and SSAP 522, respectively to produce a frame, which is then sent to the source LAN terminal. These data items are used to supply the LAN terminal with a communication route up to the ISDN, thereby replying to the route discovery.

The route discovery is unique to the LAN. Ordinarily, since information to be sent to the ISDN is missing in the received frame at this point of time, the processing is terminated when the execution of the step 714 is finished. If the received frame contains information to the ISDN terminal, control is passed to a step 724 for the subsequent processing.

Figure 11:
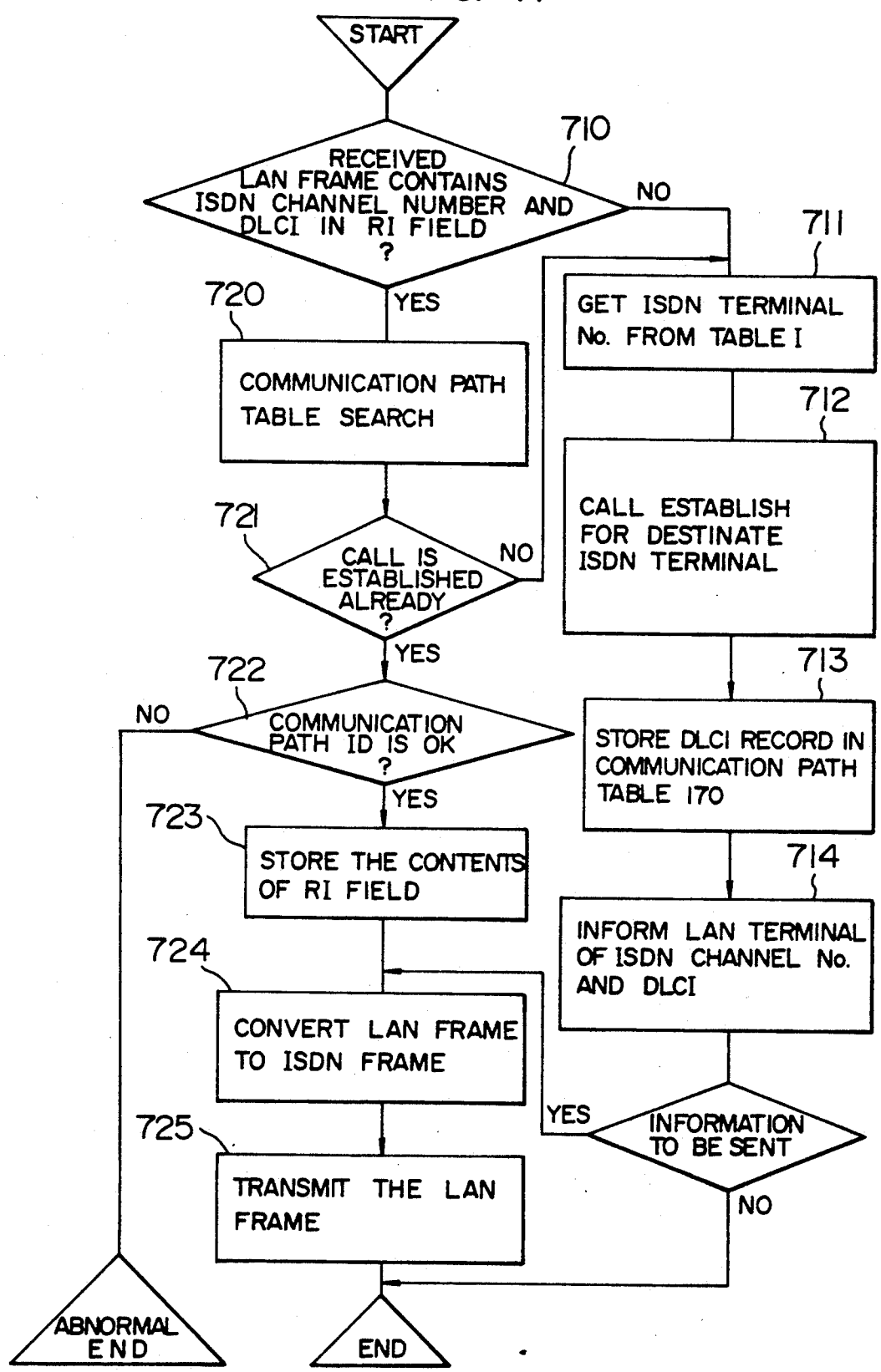
FIG. 11 is a flowchart showing an embodiment of the processing to be executed by the inter-working unit 100 on receiving an LAN frame.

In a case where the received frame contains the ISDN channel number and the DLCI, processing steps 720 to 725 of FIG. 11 are carried out as follows. Step 720: The system retrieves the communication path table 170 by using ISDN channel number and the DLCI as relative addresses P$_l$ and DLCI$_l$ relative to the first addresses of the channel number table 171 and the DLCI table 172, respectively. Step 721: A check is made to determine whether or not the COND field 1721 indicates a completion of a call establishment. If this is the case, control is passed to the step 722; otherwise, the processing proceeds to the step 711. Step 722: The communication path identifier of the received frame is checked against the values registered to the DLCI table 172. Namely, the values of the fields DA 512, SA 513, DSAP 521, and SSAP 522 are compared with those of the DAi 1724, SAj 1725, DSAPi 1726, and SSAPj 1727, respectively. If a matching condition results, control is passed to the step 723; otherwise, an abnormal end takes place. Step 723: The contents of the RI field 514 of the received frame are stored in the RI field 1728 of the DLCI table 172. Step 724: The MAC header 50 and the LLC header 52 of the received LAN frame are replaced with the header 60 of the ISDN frame. Namely, the DLCI field 612 is contained in the LAPD header field 60 of the produced ISDN frame. Step 725: An ISDN channel is selected in association with the ISDN channel number to send the ISDN frame therethrough. More specifically, a transmission instruction is issued to the interface 123.

Referring next to FIGS. 7, 9, 12, and 13, a description will be given of operations to be processed by the LAN/ISDN inter-working unit 100 on receiving a frame from the ISDN terminal 300-i.

In the configuration of FIG. 7, when a frame is received from the side of the ISDN 30, the ISDN interconnector 120 adds to the received ISDN frame an ISDN channel number of a channel through which the frame is received so as to store the resultant frame in the frame buffer 150. In an ordinary case, the ISDN interconnector 120 accomplishes only the LAPD-C processing, namely, the LAPD-P is not processed. The LAPD-P processing is carried out only for a particular or special message such as a call establishment message or a call clear message. These peculiar messages can be discriminated depending on the value set to the DLCI field of the received messages.

Figure 13:
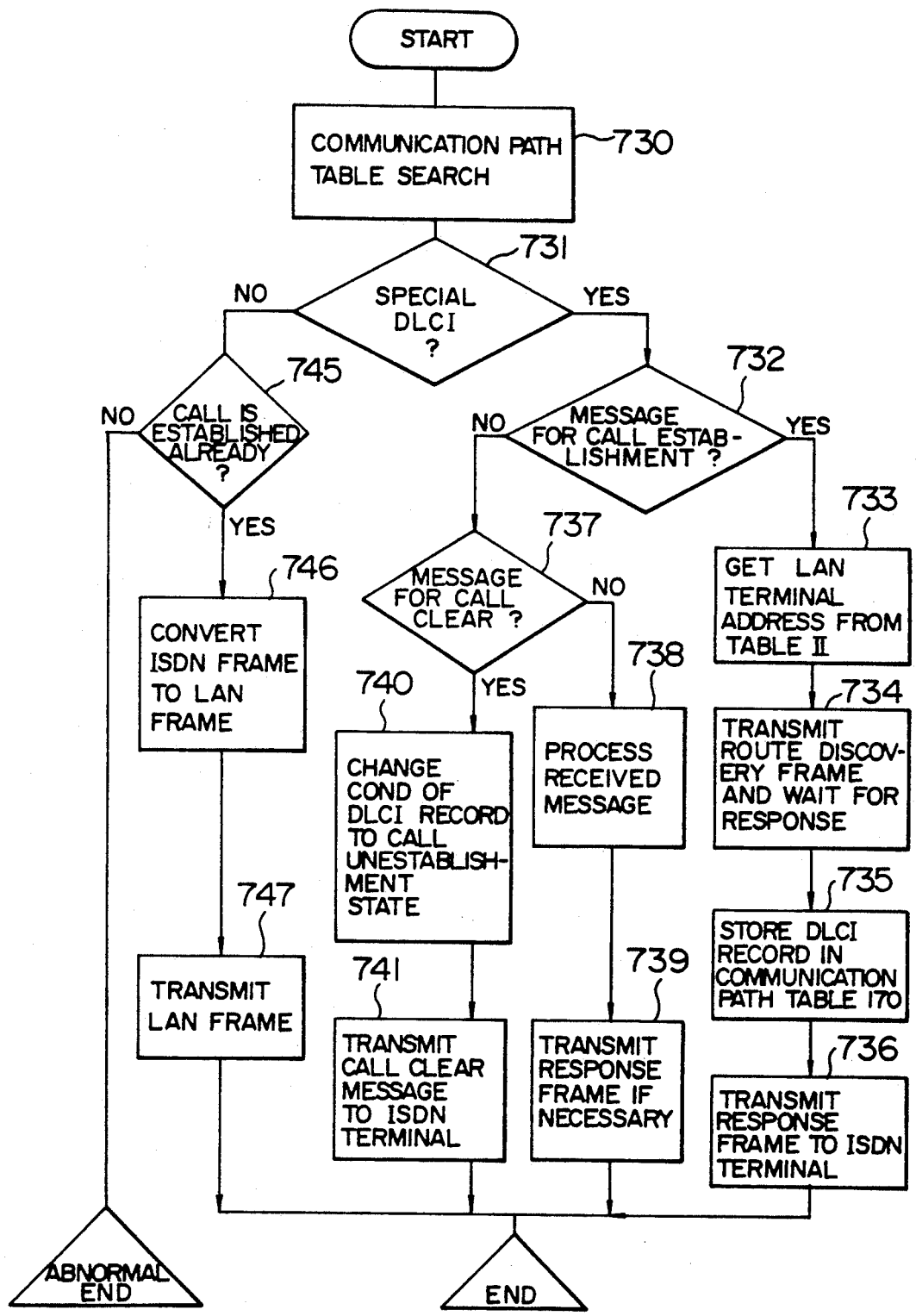
FIG. 13 is a flowchart showing an embodiment of the processing to be executed by the inter-working unit 100 on receiving an LAN frame.

When the frame stored in the frame buffer 150 is an ISDN frame, the CPU 131 references the relation table II 182 of FIGS. 9 and 12 to execute processing in accordance with the flowchart of FIG. 13 as follows. Step 730: Based on the ISDN channel number and the DLCI 612 of the ISDN frame, a retrieval is conducted through the communication path table 170 of FIG. 9. Step 731: As a result of the table retrieval, depending on the content of the CNT field 1723 of the table entry, the CPU 131 determines whether or not the DLCI is a special DLCI for a call establishment or clear request. If this is the case, control is transferred to a step 732; otherwise, the processing proceeds to a step 745. Step 732: The content of the information field 63 of the received frame is checked for decision of the received message. If the message is a call establishment message, the CPU 131 passes control to a step 733, otherwise, control branches to a step 737. Step 733: The relation table II 182 of FIG. 12 is referenced to obtain an address of an LAN terminal corresponding to the pseudo LAN terminal number (address). Step 734: A route discovery frame is sent to the LAN terminal determined in the step 733. If the communication route has already been known, this step 734 may be omitted. The route discovery frame includes the RI field 514 set to the following value in the frame format of FIG. 5.

RT="1XX", D="0", RD1=DLCI, RD2=ISDN channel number.

The DLCI loaded in the RD 1 above is identical to the content of the field 612 of the call establishment message received in the current operation. Namely, this value is different from that of the special DLCI above.

On receiving the route discovery frame, the LAN terminal sends as a reply thereto a route discovery response frame to the LAN/ISDN inter-working unit 100. Step 735: Based on the route discovery frame previously transmitted and the response frame associated therewith, a control record is stored in the communication path table 170. That is, the DLCI table address is loaded in a memory area at a position of the channel number table 171 designated by the ISDN channel number P$_l$, and a DLCI record (entry) including the items CNT, COND, DAi, SAj, DSAPi, SSAPj, and RI is registered to a location of the DLCI table 172 at an address indicated by the DLCI$_l$. In this connection, ordinarily, the content of the CNT field 1723 is a DLCI; whereas the COND field 1721 contains a value denoting a completed state of a call establishment. Step 736: A call establishment response message is sent to an ISDN terminal as the source terminal of the call establishment message. Step 737: In the similar manner as for the decision of the call establishment message, the CPU 131 checks to determine whether or not the received message is a call clear message. If this is the case, the program proceeds to a step 740; otherwise, control is passed to a step 738. Step 738: The received message is processed. Step 739: A response message is returned, if necessary, to the source ISDN terminal, thereby terminating this processing routine. Step 740: When loading the frame buffer 150 with the received call clear message or a frame poriton thereof, the CPU 131 conducts a retrieval of the communication path table 170 of FIG. 9 based on key items including the ISDN channel number added by the ISDN inter-connector 120 and the DLCI 612 of the call clear message so as to set "0XX" designating a call establishment incompleted state to the COND field 1721 of an entry of the table 170 associated with the key items above. Step 741: A call disestablishment message is produced to be transmitted to the ISDN terminal as the call clear message source. Step 745: A check is made through the communication path table 170 to determine whether or not the value of the COND field 1721 of the partinent entry thereof indicates a call establishment completed state. If this is not the case, an abnormal termination occurs (e.g. the received frame is written in a log and the content of the error counter is incremented by one).

If the COND field 1721 denotes the completion of the call establishment, the processing proceeds to a step 746. Step 746: Values of the items DAi, SAj, DSAPi, SSAPJ, and RI are attained from the table entry determined in the step 730. These values are set to the header portion of the received ISDN frame, thereby converting the ISDN frame into an LAN frame. Namely, the frame format conversion is accomplished from the format of FIG. 4B into that of FIG. 4A. Step 747: The resultant LAN frame is sent via the bridge 111 to the LAN 20.

Figure 14A:
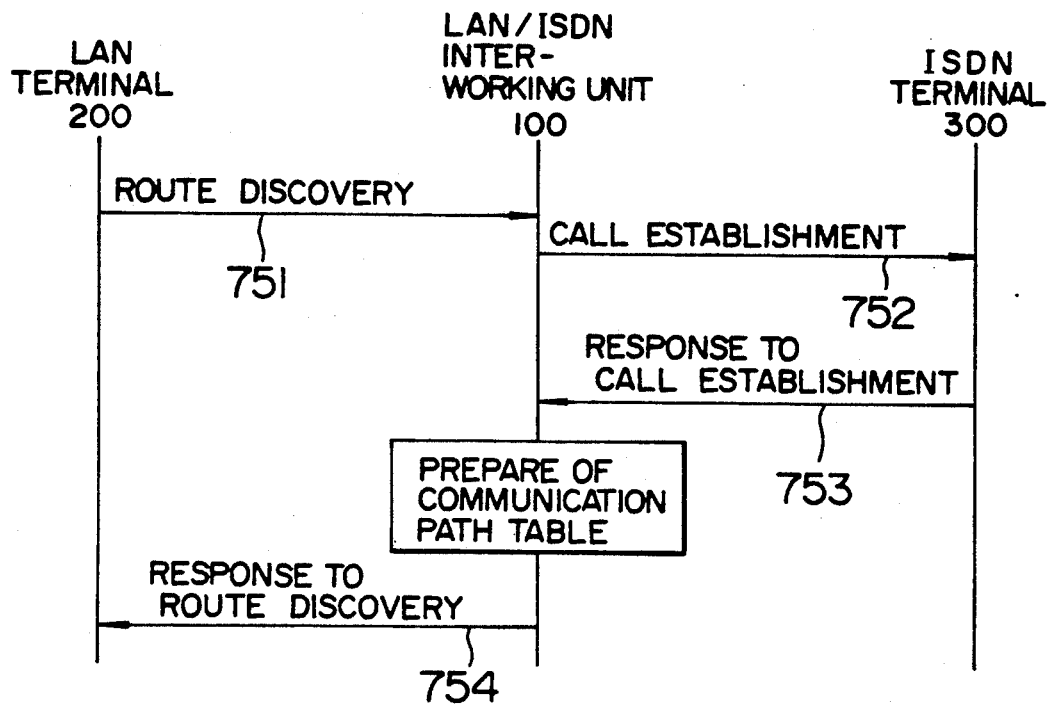
FIGS. 14A and 14B are diagrams useful to explain correspondence relationships between a route discovery on the LAN side and a call establishment on the ISDN.
Figure 14B:
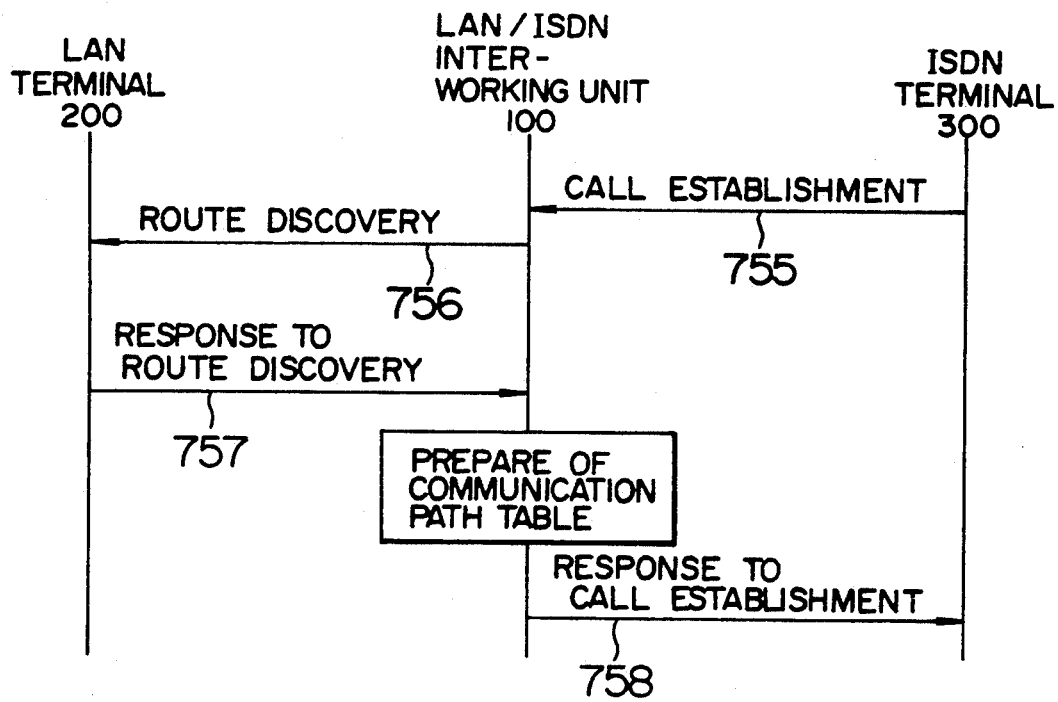

In accordance with the embodiment above, the call establishment conducted on the ISDN side can be achieved at a timing sinchronized with the route discovery as shown in FIGS. 14A and 14B. In other words, on receiving a route discovery frame 751 (RI field containing RT="1XX") from the LAN terminal 200, the LAN/ISDN inter-working unit 100 sends a call establishment message 752 to the ISDN terminal 300 associated with the destination address of the route discovery frame 751 as shown in FIG. 14A. When a response message 753 to the call establishment request is received from the ISDN terminal 300, the inter-working unit 100 transmits a route discovery response frame 754 to the LAN terminal 200. As shown in FIG. 14B, on the other hand, on receiving a call establishment message 755 from the ISDN terminal 300, the inter-working unit 100 sends a route discovery frame 756 to the LAN 20. When a route discovery response frame 757 is received thereafter from the LAN terminal 200, the inter-working unit 100 supplies a call establishment response 758 to the ISDN terminal 300.

In this regard, at an occurrence of a call clear request, since a frame corresponding to the call clear message has not been defined on the LAN 200 side, the call clear request is processed as follows, for example. Namely, the LAN/ISDN inter-working unit 100 monitors the communications to determine whether or not a period of time in which the frame communication is suspended between the ISDN terminal 300 and the LAN terminal 200 has exceeded a predetermined period of time. If this is the case, the inter-working unit 100 clears the call between the LAN terminal 200 and the unit 100 so as to set a call establishment incompletion state to the pertinent COND field 1721 of the DLCI table 172 of FIG. 9. The COND field 1721 is also set to the same state when the ISDN terminal issues a call clear request. However, the inter-working unit 100 does not report the call state change above to the LAN terminal 200.

Subsequently, a description will be given of a second embodiment according to the present invention in which the source routing system is not adopted in the LAN terminals 200. Like in the first embodiment, assuming that the network configuration of FIG. 1, the frame structures of FIGS. 4A and 4B, and the protocol constitution of FIG. 6 are also used in the second embodiment, the LAN/ISDN inter-working unit 100 is to be configured as shown in FIG. 7 like in the case of the first embodiment.

In the existing LAN terminals standardized in conformity with the IEEE 802.2 to 802.5, the OSI layers 1 and 2 are not provided with functions for achieving the ISDN communication path specification and the ISDN call establishment. In consequence, when these LAN terminals are not functionally changed, for any frame received from the LAN terminals, the LAN/ISDN inter-working unit 100 conducts a retrieval through the table of FIG. 3 to determine whether or not the table contains a registered entry including an ISDN channel number and a DLCI associated with the frame. If this is not the case, the unit 100 achieves a call establishment so that an ISDN channel number and a DLCI attained in the call establishment are registered to the table of FIG. 3. If these items are found in the table, an ISDN frame header containing these items is generated to transmit the attained frame to the ISDN 30. As already described, since a long period of time is required for the retrieval of the correspondence table 190 of FIG. 3, in order to minimize the table retrieval period of time, the existing LAN terminals each are provided two functions as follows.

(1) A function to communicate call establishment and call clear messages.

(2) A function to communicate a frame comprising an ISDN address in addition to an LAN terminal.

FIG. 15 shows an example of the format of the MAC header included in a frame communicated between the LAN/ISDN inter-working unit 100 and an LAN terminal 200 having these functions. In this example, the format includes a DA field 512, an SA field 513, and an RIE field 515 in place of the RI field 514. The RIE field 515, namely, a routing information extended (RIE) field is used when the LAN terminal 200 communicates with an ISDN terminal 300 and comprises an RTYPE field 5151 indicating a routing type, a length field 5152, and an ISDNA field 5153 designating an ISDN address. The RTYPE field 5151 indicates a type of a message in the ISDNA field 5153 as follows, for example. Namely, values "11X1", "11X0", "10X1", "10X0", and "00X0" respectively denote an ISDN call establishment message, an ISDN call establishment response message, an ISDN call clear message, and an ISDN call clear response message, and a message other than call control messages. In a case of a message other than the call control messages, a frame to be sent to the ISDN 20 includes a header produced depending on an ISDN channel number and a DLCI of the ISDNA field 5153.

The value set to the DA field 512 of a frame transmitted from the LAN terminal 200 is not required to be unique for each ISDN terminal. Namely, a particular address (group address) may be shared among a plurality of or all of the ISDN terminals 300. In a frame from the LAN/ISDN inter-working unit 100 to the LAN terminal 200, the particular address is loaded in the SA 513 thereof.

On receiving the frame of FIG. 15 from the LAN terminal 200, the inter-working unit 100 conducts processing as follows.

That is, if the DA field 512 of the frame contains a particular address, the frame is assumed to be destined to an ISDN terminal and then the contents of the RIE field 515 thereof are analyzed. In a case where the value of the RTYPE field 5151 denotes a call establishment message, the ISDNA field 5153 includes a DTE number of a destination terminal on the ISDN side. Using the DTE number, a call establishment message for the called ISDN terminal is created so as to be sent thereto. On receiving a response to the call establishment message, the inter-working unit 100 produces items of the communication path table 170 of FIG. 9 to send a frame including the RIE field 515 to the LAN terminal as the source of the call establishment. The RTYPE field 5151 of the transmitted frame is set to a value "11X0" designating that the call establishment response message is contained in the ISDNA field 5153. Namely, the ISDNA field 5153 is loaded with an ISDN DTE number, an ISDN channel number, and a DLCI. In the communication thereafter, the LAN terminal 200 transmits a frame including an RTYPE field 5151 set to a value "00X0" denoting a message type other than the call control types and an ISDNA field 5153 loaded with an RIE 515 identifying an ISDN channel number and a DLCI. Consequently, like in the case of the source routing system, the LAN/ISDN inter-working unit 100 can convert the header of the frame received from the LAN 20 into a header conforming to the ISDN 30, thereby sending the resultant frame to the ISDN 30. In this regard, when the RTYPE field 5151 of the frame from the LAN terminal contains a value designating a call clear message, the inter-working unit 100 sends a call clear message to the ISDN 30 and then changes the content of the pertinent COND field 1721 to a call establishment incompleted state in the DLCI table 172 of FIG. 9.

In the description above, the two embodiments each employ the network configuration of FIG. 1, namely, an LAN/ISDN inter-working unit is adopted to conduct connections or communications between LAN and ISDN terminals. However, the LAN/ISDN interconnecting system in accordance with the present invention may also be applicable to a case of a network system including a plurality of LAN/ISDN inter-working units 100-1 and 100-2, for example, as shown in FIG. 16. Namely, with the provision above, communications can be achieved via an ISDN 30 between an LAN terminal e.g. a terminal 200-j connected to a first LAN 20-1 and an LAN terminal e.g. a terminal 200-k connected to a second LAN 20-2 installed at a remote position. In this case, if the communication system used in the foregoing embodiments between the LAN and ISDN terminals is employed for the communications between the LAN/ISDN inter-working units 100-1 and 100-2, the constitution of FIG. 7 may be applied to each of the inter-working units. Moreover, the virtual MAC address need not be assigned to each LAN terminal, namely, an MAC address of each local LAN terminal may be directly used. At an ISDN call establishment, the MAC address is loaded in an ISDN terminal number extension field (user field) of a call establishment message to be notified to a partner LAN/ISDN inter-working unit.

As can be understood from the description above, in accordance with the present invention, an ISDN channel number and a DLCI assigned by an LAN/ISDN inter-working unit at a call establishment between an ISDN terminal and the inter-working unit or an ISDN channel number and a DLCI notified as a communication path identifier from another ISDN or a partner ISDN terminal are reported to an LAN terminal. In subsequent communications, the LAN terminal transmits an LAN frame including, in addition to the conventional LAN communication path identifier (comprising items DA, SA, DSAP, and SSAP), the ISDN channel number and the DLCI thus received. In consequence, according to the present invention, the LAN/ISDN inter-working units each need not accomplish the table retrieval to determine an ISDN communication path identifier corresponding to the LAN communication path identifier, thereby reducing the period of time required to convert an LAN frame into an ISDN frame.

Moreover, in a case where the source routing system is adopted for the LAN terminals, the ISDN channel number and the DLCI may possibly be loaded in a route information area of a route discovery frame to be notified to a partner terminal.

We claim:

1. An interconnection method for use in a network system wherein a local area network (LAN) connected to a plurality of LAN terminals is linked via an inter-working unit with an integrated services digital network (ISDN) connected to a plurality of ISDN terminals and each of the ISDN terminals has a function to multiplex a plurality of ISDN communication paths respectively identified by data link connection identifiers (DLCIs) on an ISDN channel, comprising the steps of:

executing, by the inter-working unit with coordination with said ISDN, in response to receipt of a LAN frame set by one of said LAN terminals via said LAN, wherein said LAN frame includes a header field loaded with a transmission destination address indicating one of said ISDN terminals and a transmission source address indicating said one LAN terminal, a call establishment procedure to form an ISDN communication path between the inter-working unit and said one ISDN terminal identified by the destination address to determine communication path information including an ISDN channel number and a DLCI assigned to said ISDN communication path thus formed if the ISDN communication path is not established yet;

converting said received LAN frame to an ISDN frame based on said determined communication path information and sending he ISDN frame to said ISDN by the inter-working unit if said received LAN frame is to be transmitted to said one ISDN terminal;

sending from the inter-working unit to the LAN a control frame destined to said one LAN terminal, said control frame being loaded with said determined ISDN communication path information including said ISDN channel number and said DLCI;

sending from said one LAN terminal having received the control frame to the LAN a LAN frame destined to the ISDN terminal, said LAN frame includes a header field loaded with the ISDN communication path information informed by said control frame;

converting by said inter-working unit, upon receipt of said LAN frame including the ISDN communicating path information, the received LAN frame into an ISDN frame based on said ISDN communication path information included in the received LAN frame; and sending by the inter-working unit the converted ISDN frame to said ISDN.

2. A method according to claim 1 further comprising the steps of:

loading by said inter-working unit a memory, at an execution of said call establishment procedure, with a correspondence relation between said ISDN communication path information and LAN communication path information contained in said LAN frame;

referring by said inter-working unit to the memory, on receiving one of ISDN frames sent from the ISDN terminals, to convert the received one ISDN frame into a LAN frame including a header field loaded with said LAN communication path information; and sending by said inter-working unit the LAN frame attained through the format conversion to the LAN.

3. A method according to claim 2, wherein the LAN communication path information stored in the memory by the inter-working unit includes address information items at a media access control (MAC) level beforehand respectively assigned to destination and source terminals of the LAN frame and service access points at a logical link control (LLC) level respectively of the destination and source terminals of the LAN frame.

4. A method according o claim 1 wherein:

said inter-working unit memorizes a correspondence relation between an actual ISDN terminal address assigned to each ISDN terminal to be effective in the ISDN and an ISDN terminal pseudo address assigned to each ISDN terminal to be effective in the LAN; and said inter-working unit conducts, when the received LAN frame contains an ISDN terminal pseudo address as a destination address, the call establishment operation by use of an actual address associated with the pseudo address.

5. An interconnection method for use in a network system in which a local area network (LAN) connected to a plurality of LAN terminals is linked via an inter-working unit with an integrated services digital network (ISDN) connected to a plurality of ISDN terminals and each of the ISDN terminals has a function to multiplex a plurality of ISDN communication paths respectively identified by data link connection identifiers (DLCIS) on an ISDN channel comprising the steps of:

sending by an ISDN terminal a call establishment message which includes a destination address indicating a LAN terminal;

establishing by the inter-working unit having received the call establishment message an ISDN communication path between the ISDN terminal and the inter-working unit;

sending by the inter-working unit a control frame loaded with information defining the ISDN communication path to said LAN terminal specified by said destination address of the call establishment message;

sending by the LAN terminal, after receiving the control frame, a LAN frame destined to the ISDN terminal in a format including the information defining the ISDN communication path informed by said control frame;

converting by the inter-working unit, on receiving the LAN frame destined to the ISDN terminal, the received LAN frame into an ISDN frame based on the information defining the ISDN communication path; and transmitting from the inter-working unit the converted ISDN frame to the ISDN.

6. An interconnection method for use in a network system in which a local area network (LAN) connected to a plurality of LAN terminals is linked via an inter-working unit with an integrated services digital network (ISDN) connected to a plurality of ISDN terminals and each of the ISDN terminals has a function to multiplex a plurality of ISDN communication paths respectively identified by data link connection identifiers (DLCIs) on an ISDN channel comprising the steps of:

transmitting from a LAN terminal to the LAN a route discovery frame for discovering a route from the LAN terminal to an ISDN terminal;

executing by the inter-working unit having received the route discovery frame from the LAN, a call establishment operation to establish a call between the inter-working unit and the ISDN terminal to obtain ISDN communication path information defining an ISDN communication path formed through the call establishment operation;

transmitting from the inter-working unit to the LAN a route discovery response frame including said ISDN communication path information obtained through the call establishment operation;

sending from the LAN terminal to the LAN, after receipt of the route discovery response frame a LAN frame having a header field including the ISDN communication path information;

conducting by the inter-working unit having received the LAN frame a format conversion operation to convert the received LAN frame into an ISDN frame based on the ISDN communication path information included in the received LAN frame; and transmitting the converted ISDN frame from the inter-working unit to the ISDN.

7. A method according to claim 6 wherein:

said inter-working unit stores a correspondence relation between an actual address assigned to each ISDN terminal to be effective in the ISDN and a pseudo address assigned to each ISDN terminal to be effective in the LAN;

said LAN terminal uses a pseudo address to specify an ISDN terminal as the route discovery frame destination; and said inter-working unit executes the call establishment operation by use of an actual address corresponding to a pseudo address loaded in a destination address field of the received route discovery frame.

8. An interconnection method for use in a network system in which a local area network (LAN) connected to a plurality of LAN terminals is linked via an inter-working unit with an integrated services digital network (ISDN) connected to a plurality of ISDN terminals and each of the ISDN terminals has a function to multiplex a plurality of ISDN communication paths respectively identified by data link connection identifies (DLCIs) on an ISDN channel comprising the steps of:

sending from an ISDN terminal to the ISDN a call establishment message destined to a LAN terminal;

transmitting from the inter-working unit to the LAN terminal after receipt of the call establishment message by the inter-working unit, a route discovery frame converted from the received call establishment message by the inter-working unit, said route discovery frame having a destination address field loaded with an address of said destined LAN terminal and a routing information field loaded with an ISDN channel number and a DLCI designating a communication path employed for transmission of the call establishment message between the ISDN terminal and the inter-working unit;

sending from the LAN terminal having received the route discovery frame to the LAN a response frame in reply to the route discovery frame; and transmitting from the inter-working unit, on receiving the response frame, to the ISDN terminal which is a source of the call establishment message a response message converted from the received response frame by the inter-working unit in reply to the call establishment message.

9. A method according to claim 8 wherein:

said inter-working unit beforehand memorizes a correspondence relation between an actual address assigned to each LAN terminal to be effective in the LAN and a pseudo address assigned to each LAN terminal to be effective in the ISDN;

said ISDN terminal uses a pseudo address to specify a destination LAN terminal of the call establishment message; and said inter-working unit converts the pseudo address of the destination terminal contained in the received call establishment message into an actual destination address and specifies the actual destination address in the route discovery frame.

10. An interconnecting method in a network system in which a first network and a second network are linked with each other via an inter-working unit, a communication frame transmitted in said first network having a predetermined frame format including definition information of a communication path in different manner from that used in a communication frame format transmitted in said second network, said method comprising the steps of:

establishing a first interconnection path between a first terminal belonging to the first network and the inter-working unit by communicating a first frame between said first terminal and said inter-working unit;

generating by the inter-working unit after the establishment of said first interconnection path a second frame including path definition information defining the first communication path and sending the second frame to a second terminal belonging to the second network;

memorizing by the second terminal received said second frame, the definition information of the first communication path included in the received second frame;

transmitting from the second terminal to the second network a communication frame which is destined to the first terminal and is loaded with the definition information of the first communication path; and relaying by the inter-working unit the communication frame received from the second network to the first network based on the definition information included in the received communication frame after converting the received communication frame into a communication frame having a frame format effective in the first network.

11. A network system comprising:

a local area network (LAN) connected to a plurality of LAN terminals;

an integrated service digital network (ISDN) connected to a plurality of ISDN terminals each having a function to multiplex a plurality of ISDN communication paths respectively identified by data link connection identifiers (DLCIs) on an ISDN channel; and inter-work means for connecting said LAN to said ISDN;

said inter-work means including:

means responsive to a reception of a call establishment request message destined to an LAN terminal from an ISDN terminal or to a reception of a communication frame destined to an ISDN terminal from a LAN terminal for establishing an ISDN communication path between said inter-work means and said ISDN terminal;

means for transmitting to said LAN a LAN frame to supply said LAN terminal with ISDN communication path information identifying the ISDN communication path; and means operative when a frame received from said LAN includes ISDN communication path information for accomplishing a format conversion to convert the received frame into an ISDN frame, thereby sending the converted ISDN frame to said ISDN.

* * * * *